United States Patent Office 3,179,706
Patented Apr. 20, 1965

3,179,706
DEHYDROGENATION PROCESS
Emerson H. Lee, Texas City, Tex., assignor to Monsanto Company, a corporation of Delaware
No Drawing. Filed Jan. 3, 1961, Ser. No. 80,017
3 Claims. (Cl. 260—669)

This invention relates to an improved process for the catalytic dehydrogenation of ethylbenzene to produce styrene.

In view of its utility in the production of plastics, styrene has achieved considerable industrial importance. It may be polymerized with various co-monomers to produce a variety of synthetic rubbers and to yield resins which are suitable for manufacturing numerous articles of commerce by casting, compressing, molding and the like, besides being used with other polymerizable materials. Styrene may be homopolymerized to produce polystyrene, one of the most widely used synthetic resins.

It is well known that styrene is produced commercially by the catalytic dehydrogenation of ethylbenzene. The process is usually carried out by passing ethylbenzene and 1 to 30 mols of steam per mol of hydrocarbon over a bed of a suitable catalyst at an elevated temperature. The catalysts used in the process usually contain as a primary active constituent, metals of Groups IV to VIII of the Periodic Table either in a free form or preferably in the form of various of their compounds such as oxides, sulfides, phosphates and the like. Generally, mixtures of two or more of such compounds are employed. Some of these catalysts are characterized by certain disadvantages such as low conversion and selectivity, poor physical strength, short catalyst life and necessity for frequent regeneration. Typical catalysts that have been found to have a minimum of these disadvantages are catalysts containing iron oxide and small amounts of another metal oxide as a stabilizer and a small amount of an alkali metal compound as a promoter. These compounds are autoregenerative under conditions at which the dehydrogenation reaction is carried out, that is, they are capable of being continually regenerated as a catalyst. This obviates the necessity for interrupting the process to regenerate the catalyst which includes burning of the carbon deposits off the surface of the catalyst particles as is required in other dehydrogenation systems. While these catalysts are generally suitable and widely used because of the above mentioned advantages they do not provide for maximum activity and maximum mol percent selectivity of reaction. Research is being constantly conducted to discover means by which activity and selectivity can be improved. One such means is to pretreat the catalyst with steam to eliminate any air present and optimize the oxidation state and thus increase activity and selectivity.

The object, therefore, of this invention is to provide a process whereby the activity and selectivity of reaction in the catalytic dehydrogenation of ethylbenzene to styrene is improved. It has now been discovered that an increase in activity and in selectivity of reaction can be effected by pretreating the dehydrogenation catalyst with steam and hydrogen prior to using the catalyst to initiate the dehydrogenation of ethylbenzene to styrene. According to the invention ethylbenzene is dehydrogenated to styrene in the presence of added steam at elevated temperatures by contacting the ethylbenzene with an alkali metal promoted copper chromite dehydrogenation catalyst pretreated with a gaseous mixture of steam and hydrogen prior to the dehydrogenation reaction.

The following examples are given to illustrate the invention but they are not introduced with the intention of unduly limiting the generally broad scope of the invention.

Example 1

Two samples of catalyst containing about 45% copper chromite, about 5% chromium oxide, and about 25% potassium (calculated as potassium carbonate) with the remaining amount being a silicate used as a support was pretreated by passing steam through the reactor in which the catalyst was deposited for a period of approximately 16 hours. One sample consisted of catalyst pellets ⅛ inch in diameter and the other consisted of catalyst pellets ¹⁄₃₀ inch in diameter. Treatment was accomplished at a temperature of 600° C. with approximately 70 grams per hour of steam being used.

Two batches of catalyst matching the two samples above were treated in the same manner as those above except that the fluid with which they were treated was steam which contained 10 mol percent hydrogen.

The activity and selectivity of the four catalyst samples were determined in a differential reactor consisting of a quartz tube, 20 mm. in diameter, shielded by a stainless steel jacket and heated by means of a tube furnace. A portion of catalyst pellets of known weight were placed in a quartz boat disposed within the reactor. The catalyst beds were only 1 or 2 pellets in depth in order to eliminate apparent differences in catalyst activity caused by the limited rate of diffusion of gases through the beds.

The reactor was heated and steam was passed through it to remove air from the system. Ethylbenzene with steam in a weight ratio of steam to ethylbenzene of 2.2 to 1 was passed through the reactor at a rate of approximately 30 grams per hour, a pressure of one atmosphere and at a temperature of about 600° C., over a reaction period of approximately 4 hours.

The effluent gas passed from the reactor into a water cooled condenser and the condensate was collected in a receiving flask. Non-condensible gas was passed through a wet test meter and vented after measurement. Samples of the organic condensate were taken every hour and analyzed for styrene, benzene, and toluene. Catalyst activity and selectivity for each of the various runs at 600° C. were calculated and are tabulated below. All activity and selectivity data given are strictly for the catalytic reaction only, corrections based on experimental determination having been made for any thermal reaction occurring.

| Catalyst | Pellet Dia., In. | Temp., °C. | Activity—Moles/Sec./ Gm. Cat×10⁸ | | | Percent Selectivity to Styrene |
|---|---|---|---|---|---|---|
| | | | Styrene | Benzene | Toluene | |
| Copper Chromite with steam pretreatment | ⅛ | 599 | 90.3 | 4.6 | 7.6 | 88.1 |
| | ¹⁄₃₀ | 601 | 406 | 3.0 | 7.5 | 97.5 |
| Copper Chromite with hydrogen and steam pretreatment | ⅛ | 600 | 100 | 4.1 | 11.6 | 91.0 |
| | ¹⁄₃₀ | 601 | 576 | -------- | 7.7 | 98.7 |

The experimental data obtained show that the catalyst pellets pretreated with hydrogen and steam have definite improvements in selectivity and activity over catalyst pretreated with steam only when used as a reaction catalyst in the dehydrogenation of ethylbenzene to styrene. Improved selectivity is especially pronounced with an average of about 1.5% improvement as a result of this process. Activity is definitely improved also especially when using copper chromite catalyst.

The composition of the dehydrogenation catalyst to which the invention is applicable may vary considerably. Any alkali-metal-promoted copper chromite catalyst or any other transition metal oxide, especially oxides of titanium, vanadium, chromium, manganese, cobalt, nickel, and zinc, may be used without departing from the scope of this invention. Ordinarily a heavy metal oxide, more difficulty reducible than copper chromite, is used to stabilize the copper chromite although this component is not absolutely necessary for preparing active catalysts. The following may be used as stabilizers if desired: Oxides of metals of the right hand side of Groups I, II, and III of the Periodic System, particularly oxides of silver, zinc, and cadmium; non-acidic transition oxides of chromium, manganese, cobalt and nickel; and non-acidic oxides of thorium, zirconium, cerium, lead, bismuth and aluminum.

Among the alkali and alkaline earth metal oxides which are used as promoters, the oxides of potassium, rubidium, sodium, cesium, calcium and strontium are generally preferred with potassium being the most widely used.

In carrying out the process, conditions may be widely varied. The dehydrogenation may be carried out at any temperature in the range from 550° C. to 800° C. and at any desired pressure. It is advantageous to maintain the pressure as low as feasible and ordinarily atmospheric pressure is employed although elevated pressure is operable. The steam diluent is utilized in any amount from 1 to 30 mols of steam per mol of ethylbenzene charged. Recycle of unconverted ethylbenzene is practiced in substantially all applications. The catalyst chambers or reactors may be adiabatic or isothermal, the latter being more desirable from a processing standpoint.

A wide range of hydrogen concentration can be used to accomplish the catalyst pretreatment of this invention. Any concentration of hydrogen between about one mol percent and 99 mol percent based on the steam present can be employed. However, from a practical standpoint, a concentration of hydrogen in the steam between about 10 mol percent and about 50 mol percent is preferred.

Although the time necessary to pretreat the catalyst in a manner such that the improvement of this invention can be realized is important, a wide range is possible within the scope of this invention. Any pretreatment time from about one hour to about 50 hours will impart the desired characteristics to the catalyst so treated. The preferred time for pretreatment is from about 10 to about 25 hours.

It is desirable to pretreat the catalyst at approximately the same temperature at which the catalyst will be employed for the subsequent dehydrogenation reaction. However, it is possible for the catalyst to be pretreated at other than the usual dehydrogenation temperature and still realize the improvement described herein. For instance, the pretreatment temperature may be from about 300° C. to about 1000° C. although it is most easily accomplished at from about 500° C. to about 700° C.

What is claimed is:
1. In a process for the dehydrogenation of ethylbenzene to styrene in the presence of from about one to about 30 mols of steam per mol of ethylbenzene at a temperature of from about 550° C. to about 800° C. wherein the vaporous ethylbenzene-steam mixture is contacted with a dehydrogenation catalyst wherein the active constituent is copper chromite and the minor constituents are a heavy metal oxide stabilizer, an alkali metal oxide promoter, and a support material in a fixed bed, the improvement which comprises pretreating the said dehydrogenation catalyst with a gaseous mixture consisting essentially of steam and from 1 to about 99 mol percent hydrogen prior to said dehydrogenation reaction for a period of from one hour to about 50 hours.

2. The process as described in claim 1 wherein the temperature for pretreating said dehydrogenation catalyst with steam and hydrogen is from about 300° C. to about 1000° C.

3. The process as described in claim 1 wherein the concentration of hydrogen in the steam used for pretreating said dehydrogenation catalyst is from about 10 mol percent to about 50 mol percent, the time of said pretreating of the dehydrogenation catalyst with steam and hydrogen is from about 10 hours to about 50 hours and the temperature of said pretreating of the dehydrogenation catalyst is from about 500° C. to about 700° C.

References Cited by the Examiner
UNITED STATES PATENTS

| | | | |
|---|---|---|---|
| 1,986,241 | 1/35 | Wulf et al. | 260—669 |
| 2,401,846 | 6/46 | Summerford | 260—669 |
| 2,414,585 | 1/47 | Eggertson et al. | 260—664 |
| 2,870,228 | 1/59 | Armstrong et al. | 260—669 |
| 2,944,988 | 7/60 | Sauter et al. | 252—474 |

ALPHONSO D. SULLIVAN, *Primary Examiner.*